United States Patent
Kamperman et al.

(10) Patent No.: US 6,580,682 B1
(45) Date of Patent: Jun. 17, 2003

(54) SYSTEM FOR COPY PROTECTION OF RECORDED INFORMATION

(75) Inventors: Franciscus L. A. J. Kamperman, Eindhoven (NL); Antonius A. M. Staring, Eindhoven (NL)

(73) Assignee: Koninklijke Philips Electronics, Eindhoven (NL)

(*) Notice: Subject to any disclaimer, the term of this patent is extended or adjusted under 35 U.S.C. 154(b) by 0 days.

(21) Appl. No.: 09/408,792

(22) Filed: Sep. 30, 1999

(30) Foreign Application Priority Data

Oct. 5, 1998 (EP) .............................. 98203340

(51) Int. Cl.$^7$ ................................ G11B 7/24
(52) U.S. Cl. ................. 369/275.3; 369/53.21; 380/201; 386/94
(58) Field of Search ................ 369/275.3, 275.4, 369/30.05, 30.19, 47.12, 53.21, 84, 83; 380/201, 202, 203; 386/94; 360/60

(56) References Cited

U.S. PATENT DOCUMENTS

| | | | |
|---|---|---|---|
| 4,879,704 A | * 11/1989 | Takagi et al. ........... | 369/14 |
| 5,428,598 A | * 6/1995 | Veldhuis et al. ........ | 369/275.3 |
| 5,570,339 A | * 10/1996 | Nagano ................ | 369/275.3 |
| 5,572,507 A | * 11/1996 | Ozaki et al. ........... | 369/275.4 |
| 5,696,757 A | * 12/1997 | Ozaki et al. ........... | 369/275.4 |
| 5,737,286 A |   4/1998 | Timmermans et al. ... | 369/44.13 |
| 5,809,006 A | * 9/1998 | Davis et al. ........... | 369/275.4 |
| 5,818,812 A | * 10/1998 | Moribe et al. .......... | 369/275.1 |
| 5,886,979 A | * 3/1999 | Moribe et al. .......... | 369/275.3 |
| 5,930,209 A | * 7/1999 | Spitzenberger et al. ..... | 369/32 |
| 6,108,296 A | * 8/2000 | Kajiyama et al. ........ | 369/275.4 |
| 6,122,245 A | * 9/2000 | Kondo et al. ........... | 369/275.4 |

FOREIGN PATENT DOCUMENTS

| WO | WO9816014 | 4/1998 |
|---|---|---|
| WO | WO9833325 | 7/1998 |

OTHER PUBLICATIONS

"Applied Cryptography", Bruce Schneider, ISBN 0–471–12845–7, p. 390–392, Chapter 16.G.

* cited by examiner

Primary Examiner—Tan Dinh
(74) Attorney, Agent, or Firm—Michael E. Belk

(57) ABSTRACT

An information carrier includes information arranged according to a recorded format. The information includes format information indicative of parameters of the recording format such as start and stop addresses of user information. The information is recorded according to predefined encoding rules, which correspond to rules of a different recording format that prescribes a predefined location on the information carrier for recording the format information. However the predefined location includes a confusion pattern and the format information is recorded at a second location that is different from the predefined location. A non-compliant player is unable to read or copy the information carrier because the reading is disturbed by the wrong parameters of the recording format. A recorder is arranged for recording the confusion pattern and relocating format information, whereas a player is arranged to retrieve the relocated format information.

12 Claims, 5 Drawing Sheets

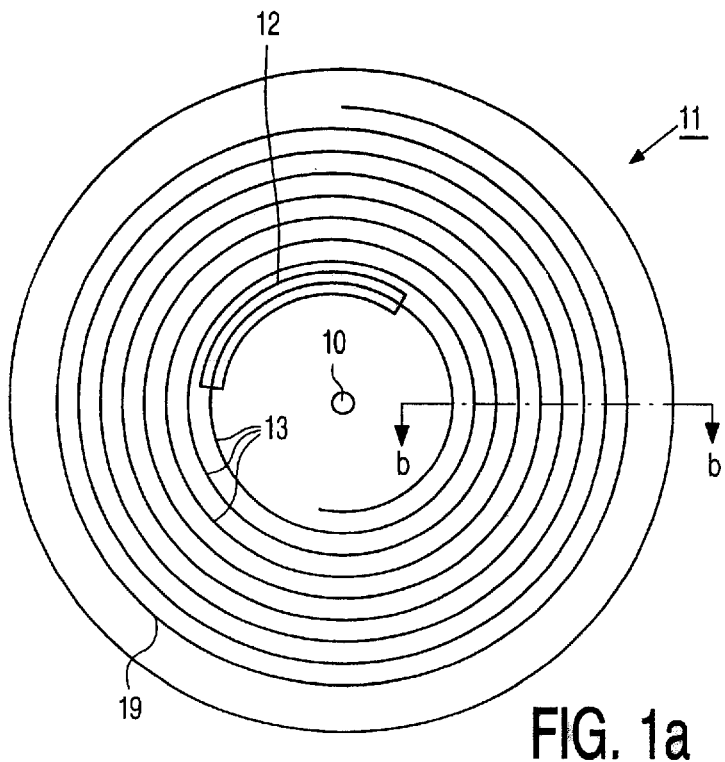
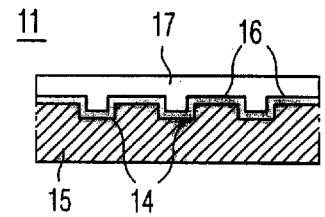
FIG. 1a
FIG. 1b
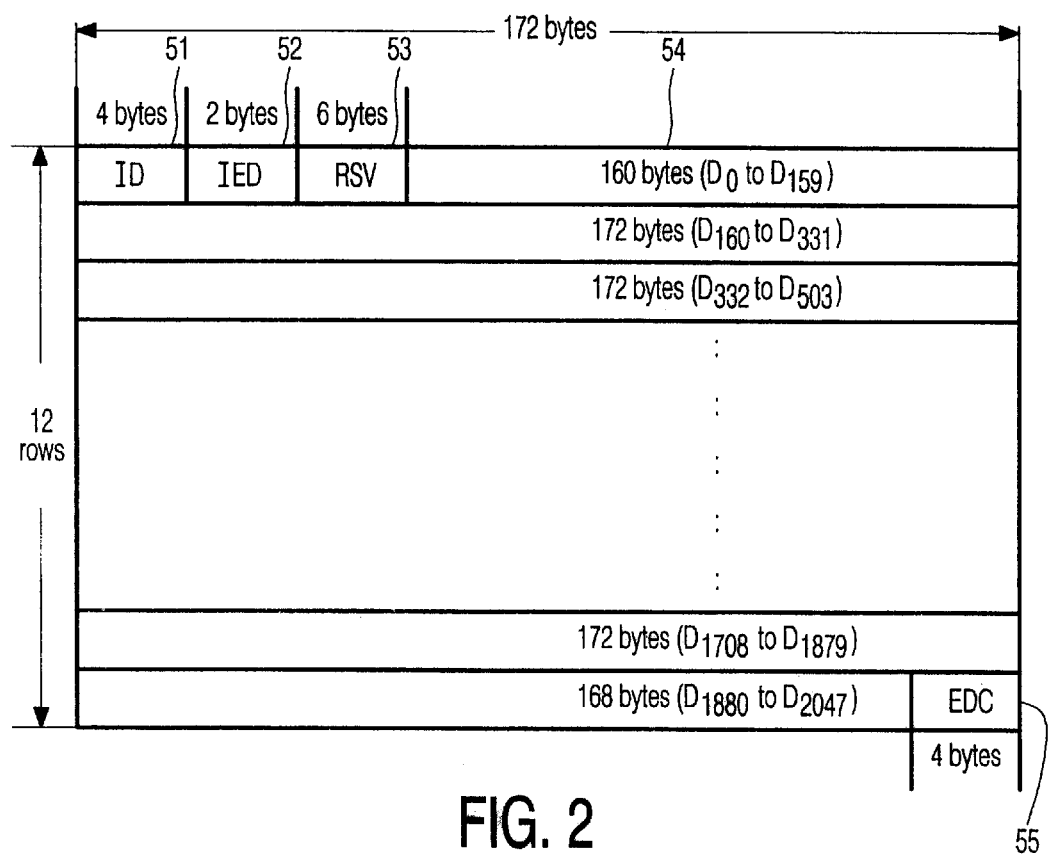
FIG. 2

| Byte number | Content | Number of bytes |
|---|---|---|
| 0 | DCV | 1 |
| 1 | DSR | 1 |
| 2 | DS | 1 |
| 3 | RD | 1 |
| 4 to 15 | DZ | 12 |
| 16 | RSV | 1 |
| 17 to 31 | RSV | 15 |
| 31 to 2047 | RSV | 2016 |

| Byte number | Content | Number of bytes |
|---|---|---|
| 0 to 15 | CON | 16 |
| 16 to 2047 | RSV | 2032 |

| Byte number | Content | Number of bytes |
|---|---|---|
| 0 to 15 | DFD | 16 |
| 16 to 2047 | RSV | 2032 |

| Byte number | Content | Number of bytes |
|---|---|---|
| 0 to m | DFK | m+1 |
| m to n | E_IV | n-m+1 |
| n to 2047 | RSV | 2048-n | ical parameters of the recording process (density, reflectivity,
SYSTEM FOR COPY PROTECTION OF RECORDED INFORMATION

FIELD OF THE INVENTION

The invention relates to the field of information formatting useful for optical or magnetic disk or tape, optical or electronic signal transmission, or other information carriers.

BACKGROUND OF THE INVENTION

An information carrier includes information arranged according to a recording format, the information being recorded according to predefined encoding rules and including format information indicative of parameters of the recording format.

A player for reproducing information from the information carrier, has format apparatus for providing parameters of the recording format, and reading apparatus for retrieving the information depending on the parameters of the recording format.

A recorder records information arranged according to a recording format on an information carrier, the recorder has recording apparatus for recording the information according to predefined encoding rules, the recorded information including format information indicating parameters of the recording format.

A method for recording information arranged according to a recording format on an information carrier includes recording the information according to predefined encoding rules, and format information is included indicating parameters of the recording format.

Those skilled in the art are directed to the following related documents:

(D1) U.S. Pat. No. 5,737,286 to Timmermans issued Apr. 7, 1998 for "System And Apparatus For Recovering Information From A Record Carrier Which Exhibits Variations Of Two Different Physical Parameters Thereof".
(D2) WO 98/16014-A1 by Bruekers et. al. for "data Compression And Expansion Of An Audio Signal".
(D3) WO 98/33325-A2 by Linnartz et. al. for "Method and system for transferring content information and supplemental information relating thereto".
(D4) "Applied cryptography", by Bruce Schneider ISBN 0-471-12845-7 pp. 390–392.

A system for copy protection of recorded information including an information carrier, a player, and a recorder, is known from U.S. Pat. No. 5,737,286 (D1 of the list of relevant documents). Copy protection may include preventing the creation of a digital copy on a different carrier, allowing some copy activity (e.g. only a first generation of copies), or controlling, verifying or restricting the access to protected information. The information carrier includes information recorded according to an existing recording format, e.g. the CD-ROM format. The format prescribes the structure of recorded information, such as what type of information is recorded at which location on the disc, e.g. that the recorded area starts with a lead-in area at a predetermined diameter. Such a format may also include other parameters such as a type of recording layer (recordable, pre-recorded, etc), a number of recording layers and physical parameters of the recording process (density, reflectivity, etc). Format information, which gives actual values of parameters of the recording format used on an information carrier in question, is included in the recorded information on the record carrier, and is intended for use by the player when reproducing user information from the information carrier, e.g. format parameters in sector headers or a Table Of Contents (TOC) which includes information indicating where the user information starts and ends. The information on the information carrier is recorded according to predefined encoding rules, such as the channel code (EFM) for translating the user bytes into lengths of optically readable pits in the CD, and error coding and sector structuring rules. Such encoding rules are usually a predefined part of the recording format, and are not indicated in the format information recorded on the disc. The player for reproducing the information carrier includes reading apparatus for reading and decoding the recorded information according to the inverse of the encoding rules.

In the system of D1 the player and information carrier form a system for controlled information reproduction, in which reproduction of illegally copied information is counteracted. Copy protection has a long history in audio or video publishing. The presently installed base of equipment, in particular Personal Computers (PC) with audio/video cards, provide little protection against unauthorized copying. In any copy-protection scheme, the most difficult issue is that a pirate can always attempt to playback an original disc, treat the content as if it were an analog home recording and record this playback. However the best quality is only available when a digital copy can be made. For digital storage media such as Digital Compact Cassette (DCC), "copy bits" have been defined, which bits indicate a copyright status, e.g. "no copy allowed", "free copy" or "one generation of copy allowed". Other copy bits may indicate that the medium storing the information must be a "professional" medium manufactured by pressing and not a "recordable" disc. However such copy bits can easily be ignored by the pirate, e.g. using a PC as copy engine. Devices which do not obey the rules of a format are called 'non-compliant' devices.

The copy protection of the system known from D1 is based on a so-called medium mark, i.e. a physical mark representing a bitpattern indicating the copyright status of the medium, e.g. a "professional" disk manufactured by pressing. The medium mark itself is not copyable or changeable by standard recording equipment and the bitpattern is to be verified by the compliant player and may even be required for reproduction, e.g. a descramble code for recovering information stored as scrambled information. On the record carrier of D1 information is recorded in the track in a predefined manner represented by optically readable patterns formed by variation of a first physical parameter, such as the height of the scanned surface. The medium mark is constituted by a variations of a second parameter of the track which are modulated according to the bitpattern, e.g. an excursion in a transverse direction of the track formed by a pregroove, also denoted as wobble. If the information of the known record carrier is copied "bit-by-bit" by a pirate on a writable information carrier using a non-compliant device, the information of this copy cannot be reproduced by a compliant player, because the copy does not include the medium mark corresponding to the illegally copied information. However detecting the medium mark and retrieving the bitpattern requires additional elements in the compliant player, whereas a compliant recorder preferably also detects any medium mark on a recordable disc. Hence, the known system for copy protection requires expensive and complex players and recorders.

The above citations are hereby incorporated herein in whole by reference.

SUMMARY OF THE INVENTION

It is an object of the invention to provide a system in which accessing and copying recorded information is controlled and which is less complex.

For this purpose, in the information carrier of the invention the encoding rules correspond to rules of a different recording format that prescribes a predefined location on the information carrier for recording the format information, the predefined location includes a confusion pattern and the format information is recorded at a second location different from the predefined location. The player as described in the opening paragraph has format apparatus arranged for detecting the recording format of the information carrier, and the format apparatus are arranged for supplying predefined parameters or for retrieving the format information from the second location when the recording format is detected. The recorder as described in the opening paragraph has recording apparatus arranged for recording a confusion pattern at the predefined location and for recording the format information at a second location different from the predefined location.

Existing, non-compliant read devices will try to read the format information from the predefined location, but will read the confusion pattern instead. This confusion pattern will cause the existing devices to stop reading, or to use wrong settings for the reading apparatus, which causes the reading process to malfunction. This has the effect, that existing devices are prevented from accessing copy protected audio/video information from the information carrier, because they cannot read the format information. Hence a digital copy cannot be made using non-compliant players or recorders, even if they are not aware of (or manipulated to disregard) any copy protection information bits. While the format information is hidden for existing players, it can be easily retrieved by the player according to the invention. This has the advantage, that the reading apparatus, although including complex decoding and error correction circuits, can be manufactured relatively cheap because substantially all components are common to existing players.

The invention is based on the recognition, that the format information must be available, but cannot be manipulated in non-compliant devices. By relocating the format information uncontrolled playback of copy protected discs by existing, non compliant devices; can be prevented. In particular, the reading and/or recording of format information cannot be controlled or manipulated by a pirate, because such steps are usually built in a control unit in the basic read or write engine. As an alternative to relocating the format information, it would be possible to change the predefined encoding rules of an existing recording system for copy protection purposes. This however increases the cost of a new copy protected recording system, because complex IC's must be redesigned and produced specifically for the new players and recorders. So in practice the encoding rules must be equal to the encoding rules of an existing system, e.g. the Compact Disc (CD) or Digital Versatile Disc (DVD) system, and non-compliant devices including such encoding and decoding apparatus are available. A record carrier recorded with the encoding rules could be played back on a non-compliant device, e.g. on the PC, and manipulation of audio/video information would be possible. However by relocating the format information according to the invention, non-compliant players are prevented from uncontrolled playback, because they rely on the format information, such as the TOC in CD or Physical Format information in DVD, for accessing the audio/video information.

In a preferred embodiment of the system of the invention the second location is variably selected within a predefined area of the information carrier and/or in that the format information located at the second location is encrypted using an encryption key. Variably selected means that when an audio/video production is put on a master disc for mass reproduction, a specific second location for that production is selected randomly from the range of possible locations. Alternatively or in combination one encryption key is generated randomly for each new production. This has the advantage, that it is more difficult for a pirate to locate or retrieve the correct format information.

BRIEF DESCRIPTION OF THE DRAWING

These and other aspects of the invention will be apparent from and elucidated further with reference to the embodiments described by way of example in the following description and with reference to the accompanying drawings, in which FIG. 1(a,b) shows a record carrier, FIG. 2 shows a logical sector structure.

Corresponding elements in different Figures have identical reference numerals.

DETAILED DESCRIPTION OF THE PREFERRED EMBODIMENT

Figures 3, 4, 5:
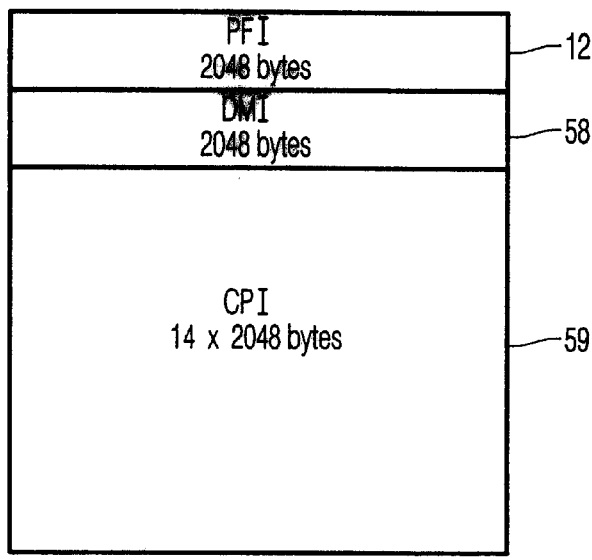
FIG. 3 shows a map of control information of an existing format.
FIG. 4 shows format information in a predefined structure.
FIG. 5 shows a confusion pattern.

FIG. 1a shows a disc-shaped information carrier 11 having a track 19 and a central hole 10. The track 19 is arranged in accordance with a spiral pattern of turns constituting substantially parallel tracks on an information layer. The information carrier may be an optical record carrier, e.g. an optical disc, having an information layer of a recordable type or of a prerecorded type. The record carrier is intended for carrying user information, for example audio or video or computer programs. Examples of a recordable disc are the CD-R and CD-RW, and the DVD-RAM, whereas the audio CD is an example of a prerecorded disc. The prerecorded type can be manufactured in a well known way by first recording a production of audio or video content on a master disc and subsequently pressing consumer discs. The track 19 on the recordable type of record carrier is indicated by a pre-embossed track structure provided during manufacture of the blank record carrier. The track structure is constituted, for example, by a pregroove 14 which enables a read/write head to follow the track 19 during scanning. The information is represented on the information layer by optically detectable marks recorded along the track, e.g. pits and lands.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier includes information recorded according to a recording format. The recording format prescribes the way information is recorded, encoded and logically mapped. The way of recording information in the format includes parameters of the recorded information, e.g. the type and number of recording layers, data speed, etc. Further the format includes encoding rules, such as channel coding, error coding or sector structuring rules. An example of a sector structure is given in FIG. 2. The encoding rules of the information carrier according to the invention correspond to known encoding rules, such as the CD or DVD format. The logical mapping may include a subdivision of the recordable area in a lead-in, a user data area and a lead-out, and control information for retrieving the user information, such as a Table Of Contents or a file system, e.g. ISO 9660 for CD-ROM. FIGS. 3 and 4 show examples of such control information, which is mapped on a predefined location on the record carrier, usually in or directly after the lead-in area. Some parameters of the format may vary for different information carriers, and for that reason format information giving the actual values of such parameters is recorded on the information carrier. The encoding rules are necessarily a predefined part of the format, because they have to be known in advance to read and decode any information, and hence the encoding rules are usually not included in the format information. The format information is recorded on a predefined location 12 on the record carrier, because all players need to retrieve the format information before further information can be read.

FIG. 2 shows a logical sector structure, as an example of a predefined encoding rule. The first part 51,52,53 constitutes a header. The first 4 bytes 51 constitute Identification Data (ID), e.g. a sector number and sector type information. The next 2 bytes 52 are for ID Error Detection (IED), and the 6 bytes 53 are Reserved (RSV) for further use, which may include copy protection status bits. After the header 12 rows 54 of main data follow (the first row being 160 bytes, then ten rows of 172 bytes and the last row of 168 bytes, 2048 bytes in total). At the end a 4 bytes Error Detection code (EDC) 55 is added.

FIG. 3 shows a schematic map of control information in the first part of the recorded area of an information carrier according to an existing format. Usually optical information carriers are logically mapped and recorded/read in outward direction, starting at a predefined diameter at the inner side of the pattern of tracks 13. The first section of the map contains format information, called Physical Format Information (PFI), and constitutes the predefined location 12. The second section 58 includes Disc Manufacturing Information (DMI), and the third section 59 includes Content Provider Information, which is further information about the user data, e.g. audio/video production information, recorded in the user information area. This control information may be recorded repeatedly for protection against read errors and dust or scratches. The map given in FIG. 3 is an example, as a control information structure may include other elements or may have a different set-up, but according to the existing format the control information structure should include at least some format information at some predefined location 12.

Figures 6, 7, 8:
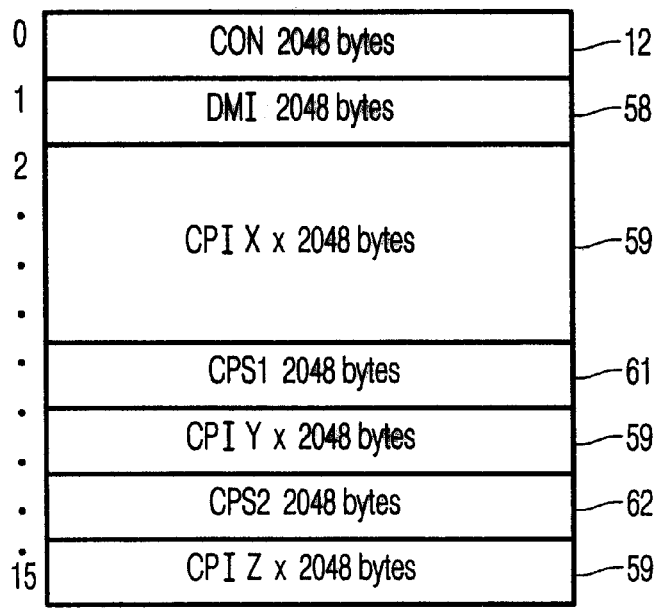
FIG. 6 shows a map of control information including copy control information.
FIG. 7 shows disc format data.
FIG. 8 shows key information.

FIG. 4 shows format information in a predefined structure. The structure and type of parameters included are predefined in the format, because all player or recorder devices must be able to retrieve the value of the parameters for controlling the reading and/or recording apparatus. The first parameter gives the Disc Category and Version (DCV), for example read-only and according to specification version number 1. Then the next parameter gives the Disc Size and transfer Rate (DSR). The third parameter gives the Disc Structure (DS), for example the number of layers and the track layout. The fourth parameter gives the Recording Density (RD), and the fifth parameter the Data Zone (DZ), for example the first and last physical sector address of the user data area. Further bytes 16, 17–31 and 32–2047 are reserved (RSV) for further use. The information carrier according to the invention complies with the encoding rules of an existing format, but the format information is relocated from the predefined location to a different location. The different location may be somewhere else within a map corresponding to FIG. 3, for example in the CPI area 59 as shown in FIG. 6, or in the reserved area bytes 16–2047 shown in FIG. 4. The predefined location 12 includes a confusion pattern, which gives wrong values to the parameters of the format. A device for playing information carriers of the existing format, a so-called non-compliant device, will read the confusion pattern, and the reading of further information will be prevented because the wrong format parameters cause wrong settings in the non-compliant device or the reading process is aborted by the control program of the non-compliant device.

In an embodiment of the information carrier according to the invention the format information includes user key information for processing the user information. As the format information is relocated as indicated above, and because the user key information is required to process the user information, a pirate player cannot fully retrieve the user information even if it manages to read information from the user area. The processing may include decryption of user audio or video information, or access control to certain options within a computer program, or verification or transfer of a copy control status. In an embodiment only part of the user information is encrypted. For example decryption is required only for some sectors of the user information area as indicated by a bit in the reserved bytes (RSV) 53 in the sector structure shown in FIG. 2. When only one sector is encrypted out of every few (e.g. 2 to 10) this has the advantage that less time is required for decryption and less computing power is required in the player. In a further embodiment the user key information is used for verifying and controlling the copyright status of the user information, and/or for verifying a watermark embedded in the user information. Such user key information, also called a control ticket, is described in D3. The control ticket is used for transferring copy status information and for performing copy generation control in a compliant recorder and/or player as described in D3. Alternatively the control ticket may be encrypted using the user key information and stored at a different location on the information carrier.

FIG. 5 shows a confusion pattern in the same structure as the format information of the existing format as shown in FIG. 4. The confusion pattern (CON) covers the bytes 0 to 15, which are used in the existing structure of FIG. 4. The confusion pattern may be all zero's, or a random pattern. In an embodiment of the information carrier the confusion pattern includes fake address information in the Data Zone bytes of the existing structure. The fake address information is indicative of an area different from the user information area, e.g. a very short area within the lead-in area or a very large area outside the physical limits of the record carrier. In an embodiment of the record carrier the fake address information is indicative of an area includes information recorded according to the existing recording format. The confusion pattern in this embodiment includes valid information, which however only covers that part of the disc which is recorded fully according to the existing format, forming a combination disc. The part according to the existing format may contain a warning message, or alternatively a different representation or a selection (a preview) of the information in the 'copy-protected' area recorded according to the format of the invention. Preferably the format area, as some drives may ignore the control information and continue playing. Some dummy information or an un-recorded area could be located between the two areas.

FIG. 6 shows a schematic map of control information including copy control information. The predefined location 12 includes the confusion pattern CON instead of the format information PFI. Next, corresponding to the existing format shown in FIG. 3, the DMI section 58 and CPI section 59 follow, which CPI section includes at least one Copy Protection System (CPS) location for recording copy protection system information, e.g. the relocated format information. In the Figure the CPI section 59 is subdivided in X,Y and Z parts by a first Copy Protection System (CPS1) section 61 and a second Copy Protection System (CPS2) section 62. CPS1 and/or CPS2 includes the format information. In an embodiment of the information carrier the CPS location is variably selected within a predefined area of the information carrier. In FIG. 6 the predefined area is constituted by the CPI area, but any area may be assigned for this purpose in the format according to the invention. The size of parts X,Y and Z varies with the selected CPS location(s), and may even be zero.

In an embodiment the information carrier includes access information. The access information is indicative of the CPS location of the format information. A pointer to the CPS location may be included in the confusion pattern or the reserved bytes 16–2047 in FIG. 4 following the bytes assigned to parameters of the existing format.

In an embodiment the access information includes Copy Protection System Index information (CPSI), which indicates that CPS locations are present and a confusion pattern is recorded in the predefined location. The CPSI includes a pointer value for searching the relocated format information in the CPS locations is included in the six reserved bytes 53 in the sector structure shown in FIG. 2. The CPSI is recorded at some predefined address(es), e.g. in some or all sectors of the lead-in area. The pointer value may be a relative pointer to a sector number within the control data area shown in FIG. 6. When several CPS locations are used, also several pointers may be used in CPSI, or a fixed distance between the CPS locations may be used, or further pointers may be included in the first CPS location.

FIG. 7 shows Disc Format Data (DFD), which is format information as relocated to a Copy Protection System location. The first 16 bytes of the DFD information can be structured as given in FIG. 4. In an embodiment the information carrier the DFD information located at the second location is encrypted using an encryption key. The encryption key may be fixed and known to compliant devices only. In an embodiment the key information is recorded on the record carrier.

FIG. 8 shows key information as recorded in a CPS location. The information carrier includes the key information for decrypting the encrypted DFD information. The first bytes 0–m includes a Disc Format Key (DFK), and the next bytes m to n includes an Encrypted initialisation Vector E_IV. An embodiment of the encryption and decryption process is described with FIGS. 11 and 12.

Figure 9:
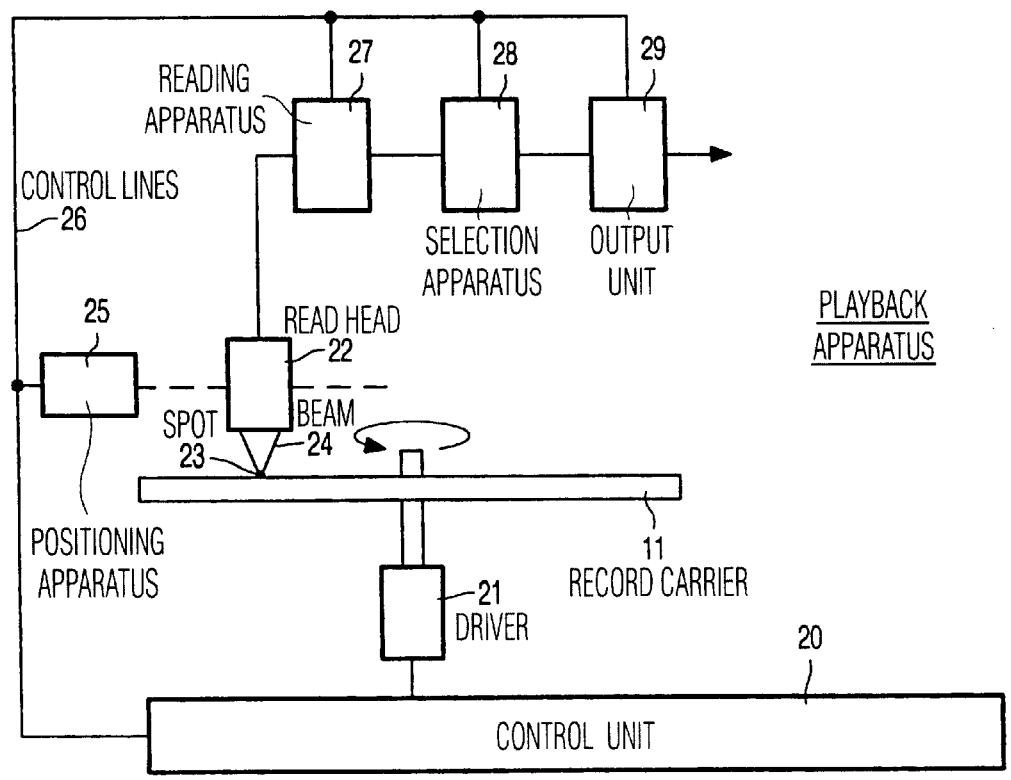
FIG. 9 shows a playback apparatus.

FIG. 9 shows a playback apparatus according to the invention for reading a record carrier 11, which record carrier is identical to the record carrier shown in FIG. 1. The device is provided with drive apparatus 21 for rotating the record carrier 1, and a read head 22 for scanning the track on the record carrier. The apparatus is provided with positioning apparatus 25 for coarsely positioning the read head 22 in the radial direction on the track. The read head includes an optical system of a known type for generating a radiation beam 24 guided through optical elements focused to a radiation spot 23 on a track of the information layer of the record carrier. The radiation beam 24 is generated by a radiation source, e.g. a laser diode. The read head further includes a focusing actuator for moving the focus of the radiation beam 24 along the optical axis of the beam and a tracking actuator for fine positioning of the spot 23 in a radial direction on the centre of the track. The tracking actuator may include coils for radially moving an optical element or may be arranged for changing the angle of a reflecting element. The radiation reflected by the information layer is detected by a detector of a usual type, e.g. a four-quadrant diode, in the read head 22 for generating a read signal and further detector signals including a tracking error and a focusing error signal coupled to the tracking and focusing actuators. The read signal is processed by a reading apparatus 27 to retrieve the information in dependence on the parameters of the recording format. The reading apparatus are of a usual type for example including a channel decoder and an error corrector which decode the read signal encoded according to the encoding rules prescribed by the format. The retrieved data is passed to a data selection apparatus 28. The data selection apparatus selects user data from all data read and passes the user data to data to output unit 29, which may, include a data buffer or user data processing apparatus, such as audio or video decompression. The device is further provided with a control unit 20 for receiving commands from a user or from a host computer for controlling the apparatus via control lines 26, e.g. a system bus, connected to the drive apparatus 21, the positioning apparatus 25; the reading apparatus 27 and the data selection apparatus 28, and output unit 29. To this end, the control unit 20 includes control circuitry, for example, a microprocessor, a program memory and control gates, for performing several procedures and functions as described below. The control unit 20 may also be implemented as a state machine in logic circuits. Selection apparatus 28 also retrieves control information from the record carrier, which is passed on to the control unit 20. Control information from the sector structure may be retrieved by reading apparatus 27 while decoding the read signal, e.g. the CPSI information described above.

The control unit 20 includes format apparatus for providing the parameters of the recording format by retrieving the format information from the CPS location. The CPS location may be known to a compliant device, and in that event the format information can be read immediately. Alternatively, a set of parameter values may be predefined and stored in control unit 20, and the stored parameter values are supplied when the format information is not retrievable from the predefined location. In an embodiment, the player includes detection apparatus for detecting the retrievability of the format information from the predefined location by detecting the confusion pattern and/or the access information. The control unit embodies the detection apparatus, which first read the predefined location, and based on the information read determine if the information carrier is recorded according to the existing format. If the information read is the confusion pattern, this is detected from recognizable wrong values for certain parameters, e.g. all zero's or a too large area for user data. The record carrier may include access information, which explicitly indicates the recording format according to the invention, such as a bit in the sector header (see FIG. 2). In an embodiment, the detection apparatus are arranged to read the access information, in particular the pointer values or CPSI as described above. In an embodiment of the player, the format apparatus are arranged for retrieving the format information from the CPS location in dependence on the access information. In the event that the information carrier includes encrypted format information, the format apparatus are arranged for decrypting the format information. The decryption process is described below with reference to FIG. 12. The necessary key information may be read from the information carrier and/or may be stored in the player.

Figure 10:
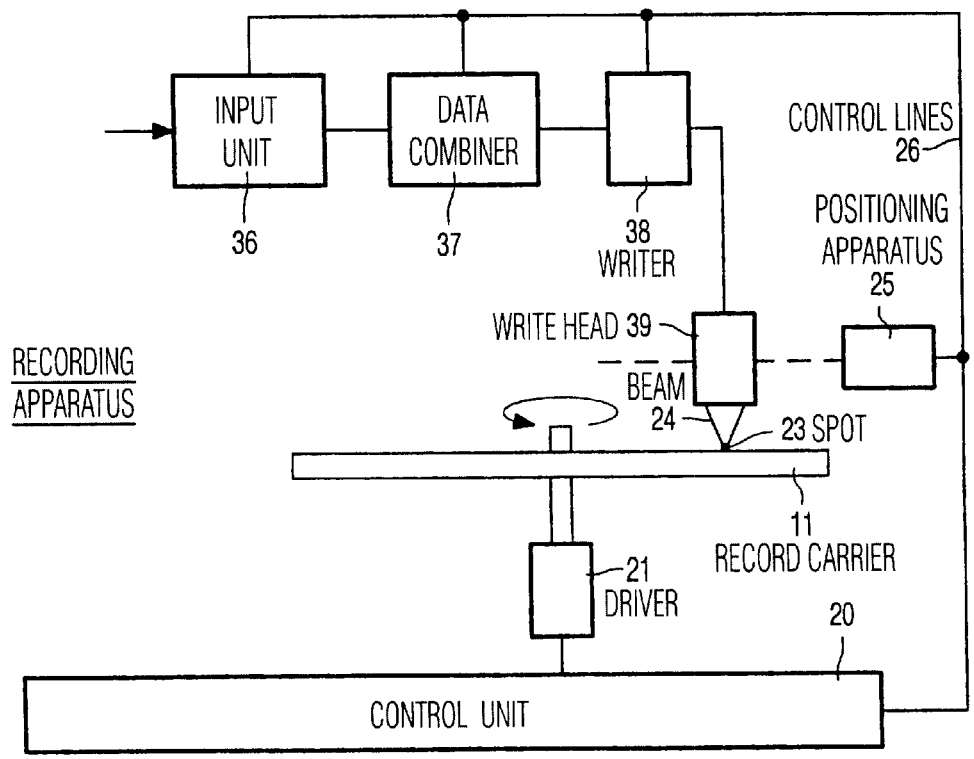
FIG. 10 shows a recording device.

FIG. 10 shows a recording device for writing information on a record carrier 11 according to the invention of a type which is (re)writable. A similar device or recording method is used for producing a master disc for manufacturing pressed discs. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by a spot 23 generated on the recording layer via a beam 24 of electromagnetic radiation, usually from a laser diode. The recording device includes similar basic elements as the apparatus for reading described above with FIG. 9, i.e. a control unit 20, a drive apparatus 21 and a positioning apparatus 25, but it has a write head 39. User information is presented on the input unit 36, which may include compression apparatus for audio or video. Suitable compression apparatus are described in D2. From the input unit 36 the data is passed to data combination apparatus 37 for adding control data including the format information. The total data stream to be recorded is passed to writing apparatus 38. The write head 39 is coupled to the writing apparatus 38, which includes for example a formatter, an error coder and a channel coder. The data presented to the input of the writing apparatus 38 is distributed over logical and physical sectors according to the predefined encoding rules and converted into a write signal for the write head 39. The control unit 20 is arranged for controlling the input unit 36, the data combination apparatus 37 and the writing apparatus 38 via control lines 26 and for performing the positioning procedure as described above for the reading apparatus. Usually the recording apparatus will also be arranged for reading having the features of the playback apparatus and a combined write/read head. The recorder also includes apparatus for including format information indicative of parameters of the recording format.

According to the invention the control unit 20 of the recording device is arranged for recording a confusion pattern at the predefined location and recording the format information at a CPS location different from the predefined location. In further embodiments of the recording device the control unit 20 is arranged for recording the format, access or key information as defined above for the information carrier with reference to FIGS. 5 to 8 and as defined in the claims for the information carrier. A method of recording for producing an information carrier is arranged to perform the functions of recording the format, access or key information as defined above for the recorder.

Figure 11:
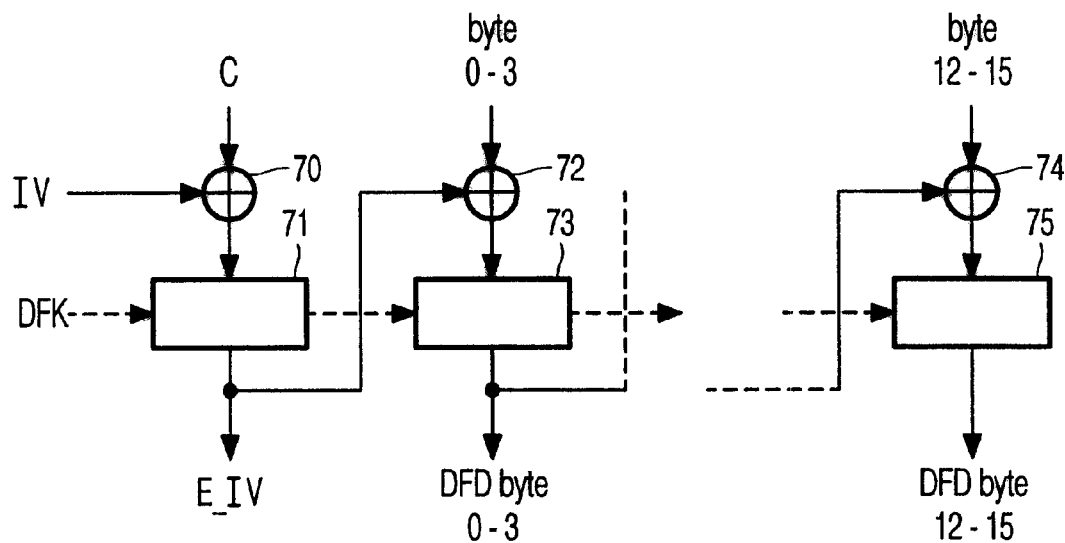
FIG. 11 shows an encryption process.

FIG. 11 shows an encryption process. The encryption process is performed in an embodiment of the control unit 20 of the recorder shown in FIG. 10. The encryption is used for encrypting the format information to encrypted DFD bytes as discussed above with reference to FIGS. 7 and 8. Any suitable encryption algorithm can be used, for example as described in D4, in particular on page 390–392 in chapter 16.9 Additive Generators. Such an algorithm can be used to produce random words. The algorithm shown processes 4 bytes in one cycle. In a first step 71 an Encrypted Initialisation Vector (E_IV) is generated using key DFK and starting from a random number IV added to a predefined constant C in adder step 70. The resulting E_IV is recorded on the information carrier. The E_IV is added to byte 0–3 of plain format information in adder step 72, and processed in encryption step 73 using the starting key values from the first step 71. Now the bytes 0–3 of the encrypted DFD are available. This step is repeated 4 times up to last step 75 for last bytes 12–15 of DFD. The 16 bytes encrypted DFD are recorded on the information carrier.

Figure 12:
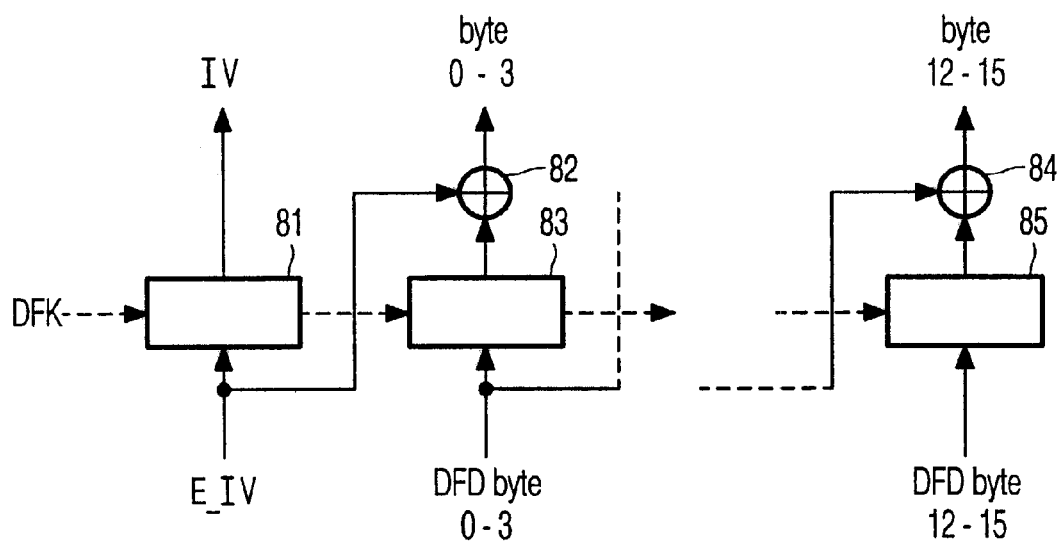
FIG. 12 shows a decryption process.

FIG. 12 shows a decryption process complementary to the encryption process shown in FIG. 11. The decryption process is performed in an embodiment of control unit 20 of the player. In a first step 81 the E_IV is decrypted using DFK as key info. The resulting IV is not used directly, but the decryption process is initialised for the next cycle. In the next cycle in a next decryption step 83 the bytes 0–3 of encrypted DFD are decrypted and added to E_IV in an adder step 82 to result in plain format information bytes 0–3. The cycle is repeated to last bytes 12–15 of encrypted DFD are decrypted in decryption step 85 and added to the previous result in adder step 84 to result in plain bytes 12–15 of format information.

Although the invention has been explained by embodiments using audio or video, the invention can be applied also to computer data. In the embodiments the information carrier is embodied by an optical disc, but any other carrier can be used in the invention, such as tape or broadcast, as long as format information is supplied on the carrier corresponding to an existing format prescribing a predefined way which cannot be easily manipulated. Further, the invention lies in each and every novel feature or combination of features described above.

What is claimed is:

1. An information carrier comprising:
   information arranged according to a recording format, the information being arranged according to predefined encoding rules and including format information indicating parameters of the recording format, the encoding rules corresponding to rules of a different recording format that prescribes a predefined location on the information carrier for recording the format information;
   a confusion pattern at the predefined location; and
   format information arranged at a second location different from the predefined location.

2. The information carrier of claim 1, in which the second location is variably selected within a predefined area of the information carrier.

3. A player comprising:
   format means for providing parameters of a recording format; and
   reading means for retrieving information depending on the parameters of the recording format;
   and in which:
       the format means are arranged for detecting the recording format of an information carrier by detecting a confusion pattern from at least one of a predefined location and access information; and the format means are arranged for supplying predefined parameters or for retrieving the format information from a second location when the recording format is detected.

4. A recorder comprising:

recording means for recording information according to predefined encoding rules and for including format information indicating parameters of the recording format;

and in which:

the encoding rules correspond to rules of a different recording format that prescribes a predefined location on the information carrier for recording the format information;

the recording means are arranged for recording a confusion pattern at the predefined location and for recording the format information at a second location different from the predefined location.

5. A method for recording information comprising the steps of:

providing an information carrier;

recording information on the information carrier according to predefined encoding rules of a different recording format that prescribes a predefined location on the information carrier for recording format information;

recording a confusion pattern at the predefined location; and recording format information indicating parameters of the recording format at a second location different from the predefined location.

6. The information carrier of claim 1, in which the information carrier comprises access information indicative of the location of the format information.

7. The information carrier of claim 1, in which the format information located at the second location is encrypted using an encryption key.

8. The information carrier of claim 7, in which the information carrier comprises key information for decrypting the encrypted information.

9. The information carrier of claim 1, in which, while the format information comprises address information indicative of a user information area, the confusion pattern comprises fake address information indicative of an area different from the user information area.

10. The information carrier of claim 9, in which the fake address information is indicative of an area comprising information recorded according to the different recording format.

11. The information carrier of claim 1, in which the format information comprises user key information for processing user information.

12. The player of claim 3, in which the format means are arranged for retrieving the format information from the second location in dependence on the access information and/or the key information.

* * * * *